Sept. 14, 1965 W. SICHAK 3,206,676

TIME DIVERSITY SYSTEM

Filed Nov. 30, 1961 3 Sheets-Sheet 1

INVENTOR.
WILLIAM SICHAK
BY Roy C. Hopgood

INVENTOR.
WILLIAM SICHAK
BY
Roy C. Hopgood

INVENTOR.
WILLIAM SICHAK
BY Roy C. Hopgood 3,206,676

TIME DIVERSITY SYSTEM

William Sichak, Nutley, N.J., assignor to Sichak Associates, Nutley, N.J., a corporation of New Jersey Filed Nov. 30, 1961, Ser. No. 155,929

6 Claims. (Cl. 325—65)

This invention relates to an improved communication system and more particularly relates to an improved time diversity system having a preselected degree of diversity.

Diversity systems, such as those described in Patent No. 2,951,152 to Sichak et al. have been used to improve the quality of the received signal when the informational content of such signal has been contaminated with noise or when the informational content of such signal has been reduced because of signal fading. In communication systems using the troposcatter (over the horizon) mode of propagation, diversity receiving systems are necessary to minimize and overcome, to some extent, the effects of short-term signal fading.

Space diversity systems utilize two or more antennas spaced apart at perhaps 50 to 100 wave lengths, and positioned along a line normal to the line of propagation. The signal received in each respective antenna is applied to utilization means through suitable circuitry. The circuitry through which each of the signals travels, for purposes herein, may be referred to as a diversity branch.

Each diversity branch is coupled to a combining means which combines the signals received in such a way as to produce a signal having a relatively more desirable signal to noise ratio which signal necessarily has a higher informational content. Such space diversity systems require at least two antennas, multiple transmission lines and receivers in the branches as well as utilizing a ground site of large area.

Frequency diversity systems are possible utilizing only one receiving antenna which receives a plurality of frequencies, each of which differs from the other by a fixed amount, for example, 10 megacycles or more apart at 500 megacycles or higher. Each of the frequencies received is coupled through respective diversity branches to a suitable combining means. Frequency diversity systems use more of the radio spectrum than actually needed and employ multiple receiving equipment, which is undesirable.

Troposcattered signals used in diversity systems vary in a random fashion at a relatively low rate. For example, the mean fading rate (which may be defined as the number of times per second the fading signal crosses the mean signal level), has been measured to be 0.6 cycle per second at 1,000 megacycles on a 180 mile path. The fading rate is approximately proportional to the radio frequency and effective over-the-horizon distance and is approximately normally distributed. The probability of obtaining a fading rate more than three times the mean rate is small.

It has been found that improved diversity can be obtained by repetitively transmitting the desired signal with a predetermined time delay between repetitions. When the diversity has been increased by N times, the probability of receiving an elemental signal correctly (which signal may be referred to herein as a bit, a mark, or a space) is given by the formula $$Pn=1-\left(\frac{2p}{2}\right)^n$$

where $p$ is the bit error rate without diversity, according to Barrow, "Error Probabilities for Telegraph Signals Transmitted by a Fading FM Carrier," Proc. IRE, vol. 48, pp. 1613–29, September 1960.

When the number of degrees of diversity are increased, it has been found that increased bandwidth is required; however, less received power is required. While the number of repetitions increase the degree of diversity, the relationship is not quite direct. For example, considering that one repetition produces one approximate degree of diversity, three repetitions produce approximately two degrees of diversity, six repetitions produce approximately three degrees of diversity and eleven repetitions produce six approximate degrees of diversity. However, for present purposes, it can be assumed that the relationship between increased repetitions and increased degrees of diversity is linear.

An object of this invention is to provide a means and method for obtaining a greater degree of diversity in a communication system by repeating the transmitted signal.

A further object of this invention is to obtain increased repetition diversity in a communication system with fewer antenna elements and fewer diversity branches.

A still further object of this invention is to provide a communication system having fewer components and thereby a more reliable system.

In general, the foregoing is accomplished by providing a means and method in which the signal to be transmitted is placed on a storage medium which signal is read out a plurality of times and transmitted to a receiver rapidly to avoid any delay in transmission. The receiver has suitable characteristics to store each signal as it is repeated in separate storage units. In this way each mark or space is repeated and stored in a plurality of storage units. These storage units may be compared collectively to indicate with relatively greater reliability, the presence or absence of a transmitted mark or space.

Other objects and advantages of this invention will become apparent from the following description taken in connection with the accompanying drawings, wherein are set forth by way of illustration and example, certain embodiments of this invention.

Figure 1:
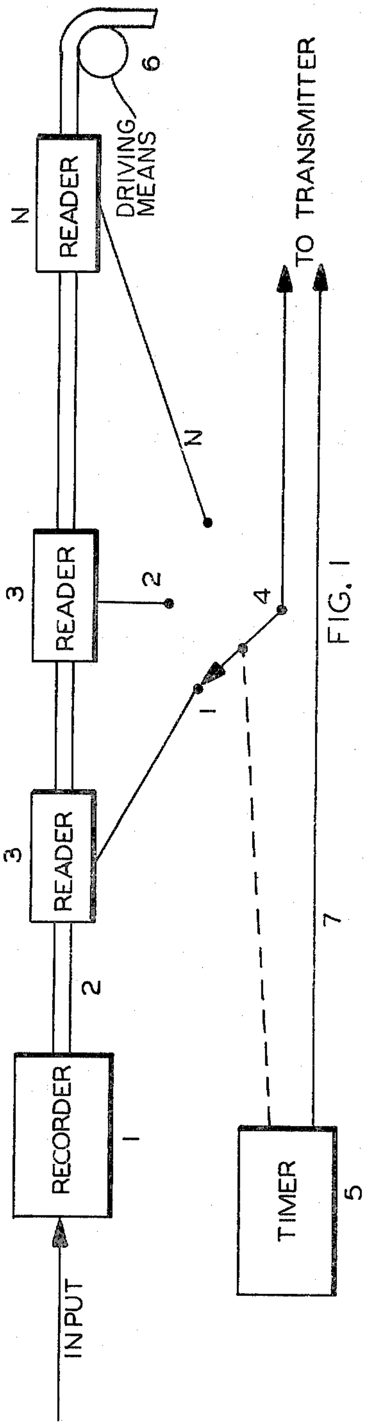
FIG. 1 is a block diagram in schematic form showing a system which can transmit a desired signal repetitively.
Figure 2:
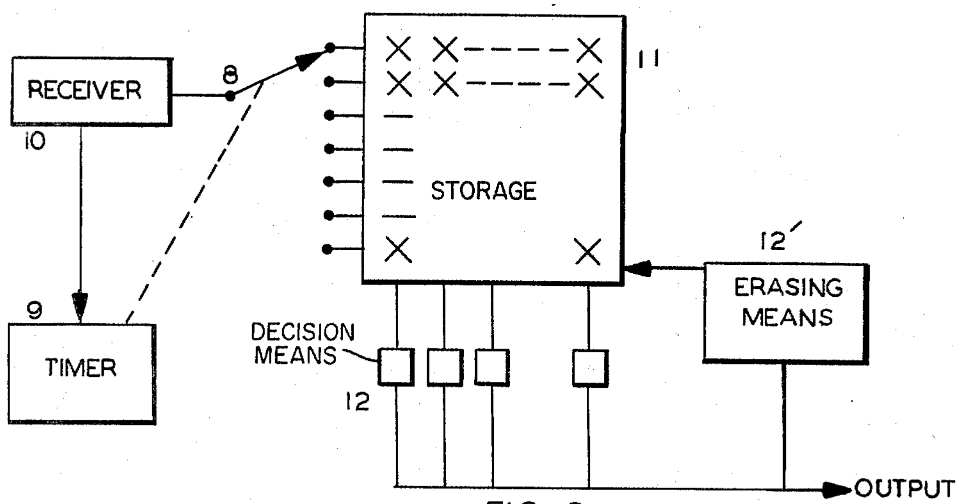
FIG. 2 shows a receiving system adapted to receive such repeated signals and to obtain an output signal having improved informational content.

Referring now to the drawings, there is shown a means and method for obtaining repetition diversity at FIGS. 1 and 2. The input signal, which may for example be a series of pulses, is applied to storage means 1, such as a magnetic tape, drum or perforated tape. Suitable reading elements 3 are used to read the stored signal. If the storage means is a magnetic tape, the reading elements can be magnetic means equally spaced along the path of the tape. There are as many reading elements as the desired degree of diversity.

Each of these reading elements is selectively connected to a suitable transmitter through a switch means 4 which in turn is controlled by a timing means 5. The switch means 4 and timing means 5 are so adjusted that the signal on the storage means is read by the particular reader at such time as the timing means 5 connects that reader to the transmitter. It is not necessary for the readers to read at the same rate as the signal is applied to the storage means; in the case where a magnetic tape is used, a driving means 6 may move the tape at any desired speed depending on whether it is desired to transmit the signals at the same rate or at a higher or lower rate than the rate of the incoming signal. In any such case, the timing means which controls switch 4 must be synchronized with the speed of the magnetic tape and the relative position of the readers.

The spacing between the readers 3 and the speed of the storage means are chosen to obtain the desired delay between repetitions, which may be for example, 0.5 second. Timing means 5 controlling switch means 4 connects the output of the first reader to the transmitter for 0.5 second, then very rapidly connects the output of the second reader to the transmitter, this cycle repeating itself continuously for a number of times equal to the desired degree of diversity.

The receiver, one embodiment of which is shown in FIG. 2 should be of the synchronous type. That is, the receiver must be capable of synchronous reception in the sense that the receiver must know when to expect an elemental signal, whether it be the presence of a mark or space. The receiver must also have a matched filter means in the sense that the receiver must have built into it precise knowledge of the form of the possible transmitter signals. This is necessary so that at the end of each predetermined interval of time, the receiver can respond with an output signal. This ouput signal will be given on the basis of whether the transmitted signal appears to be the most probable cause of the received signal heretofore stored. In order to accomplish this, the receiver may be synchronized by the transmission of a special signal sent out through transmitting means 7 when the timing means 5 is at a certain preselected position. For example, such position may correspond to that of the timing means immediately before it connects the output of the first reader to the transmitter. In this manner, the same signal is obtained from each reader but with the predetermined delay.

As shown, the receiving system of FIG. 2 has a switching means 8 similar to the switching means 4 of the transmitter and this switching means 8 is in turn controlled by a timing means 9. Timing means 9 is synchronized by the special signal received on a receiving channel 10 from the transmitting means 7. The storage means 11 may be of any suitable type having a suitable number of storage elements arranged to form rows and columns. There are as many rows as there are readers in the transmission system. Each row has enough capacity to store the signals received for a time equal to the predetermined delay. Each time a signal is transmitted, it is received and stored in one of the rows and these rows are successively occupied by the marks or spaces comprising each transmitted signal. At the end of an entire transmitting cycle and after the signal is stored in the very last row, decision means 12 compares the signals in each of the stored elements in the respective columns and depending upon this comparison, delivers a signal through the output corresponding to the majority of signals in the storage means. As an example, for a Teletype system a positive voltage can be stored for a mark and a negative voltage for a space or the absence of a mark. The decision circuit will deliver a mark signal when the sum of the stored voltages is positive, and a space signal when the sum of the stored voltages is negative. The signals stored in each column are erased by erasing means 12′ after the decision circuit operates so that the storage means 11 is ready for the next series of signals. Such erasing means 12′ may be connected to the output circuit and may be triggered by the signal from the decision circuit.

Figure 3:
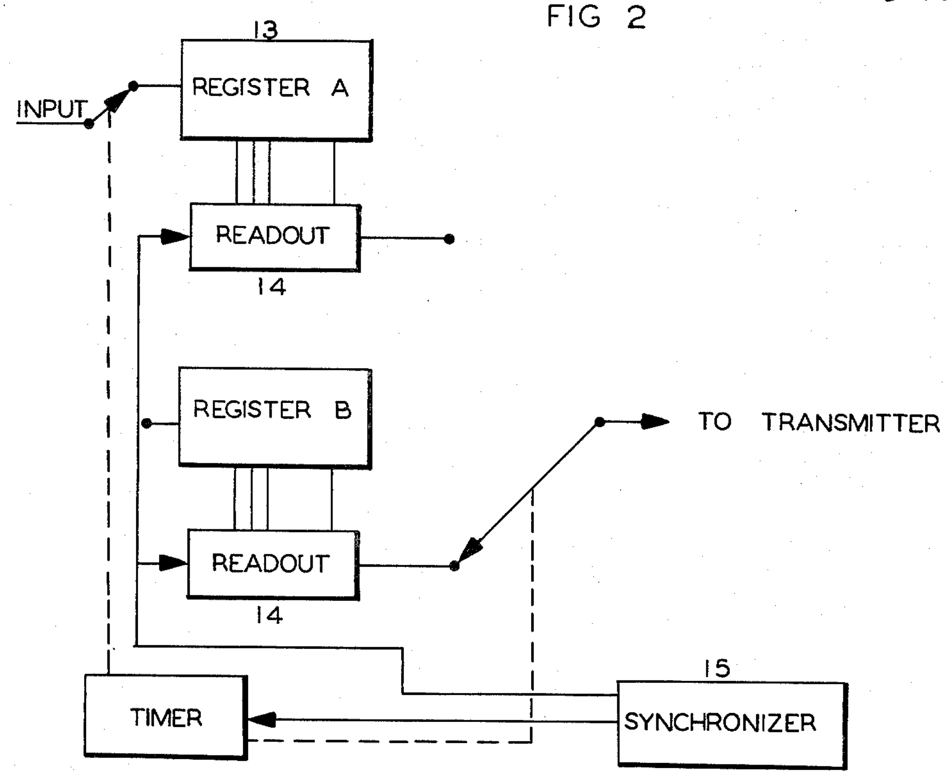
FIG. 3 is a modification of transmitting system of FIG. 1 in which the signal may be transmitted at the same rate as the signal input from the signal producing source.

The transmission system shown in FIG. 1 cannot transmit at the same rate that the signal is applied to the storage means—the signals are actually transmitted at a reduced rate equal to $1/N$ of the input rate where N is the number of readers. A variation of the above described system is shown in FIG. 3 which shows a system for transmitting at the same rate as the input. Assume that the incoming signal, such as a Teletype signal, consists of the presence or absence of a pulse at some fixed repetition rate. A group of such signals may be called a set of signals, or a word. Two storage means or registers 13, shown as registers A and B are associated with and coupled to a respective readout 14. Each register 13 has sufficient capacity to store the incoming signals during a time equal to the desired delay between repetitions. If the delay is 0.5 second, register A stores the first set of signals received for the first 0.5 second, register B stores the second set of signals received during the next 0.5 second and register A again stores the third set of signals received during the next following 0.5 second.

After the first set of signals has been stored in register A and while the second set of signals are being stored in register B the signals stored in A are read out by reader 14 N times, at a rate N times the incoming repetition rate. Each of the read outs are controlled by timing means as described in connection with FIGS. 1 and 2. During the last read out the signals in A are erased as also previously described in connection with FIGS. 1 and 2. After the last signal in register A is read out, the timer switches the input received signals to register A and the read out circuits of B to the transmitter.

There is provided a synchronizing means 15 which controls the rate at which the signals are read out and the number of repetitions, and is in turn synchronized to the incoming repetition rate by any of the known methods (not shown).

The receiving system which may be used in association with the transmission system of the FIG. 3 may be that shown in FIG. 2 except that the rate of operation must be quicker; that is, the decision comparison step or means must operate at a rate equal to the input so that the entire storage has been erased before the signals from register B are received.

Figure 4:
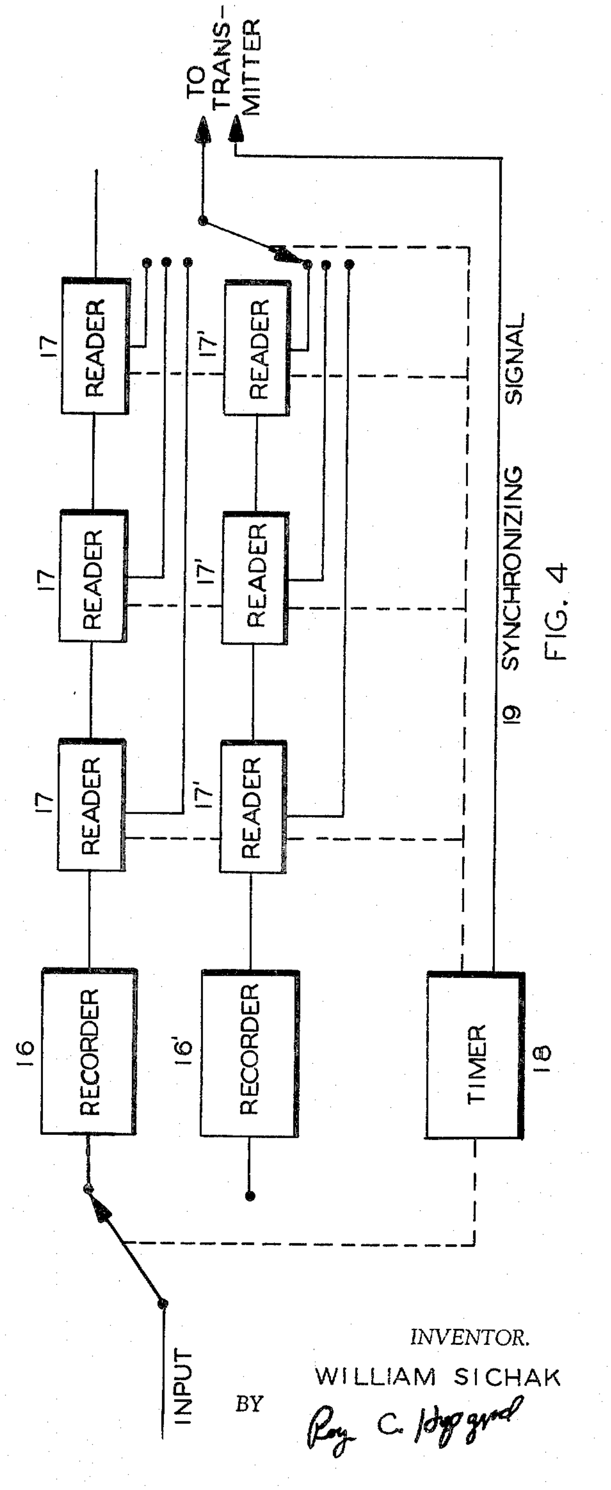
FIG. 4 is a modification of the transmitting system adapted to transmit continuous signals at a repetitive rate.
Figure 5:
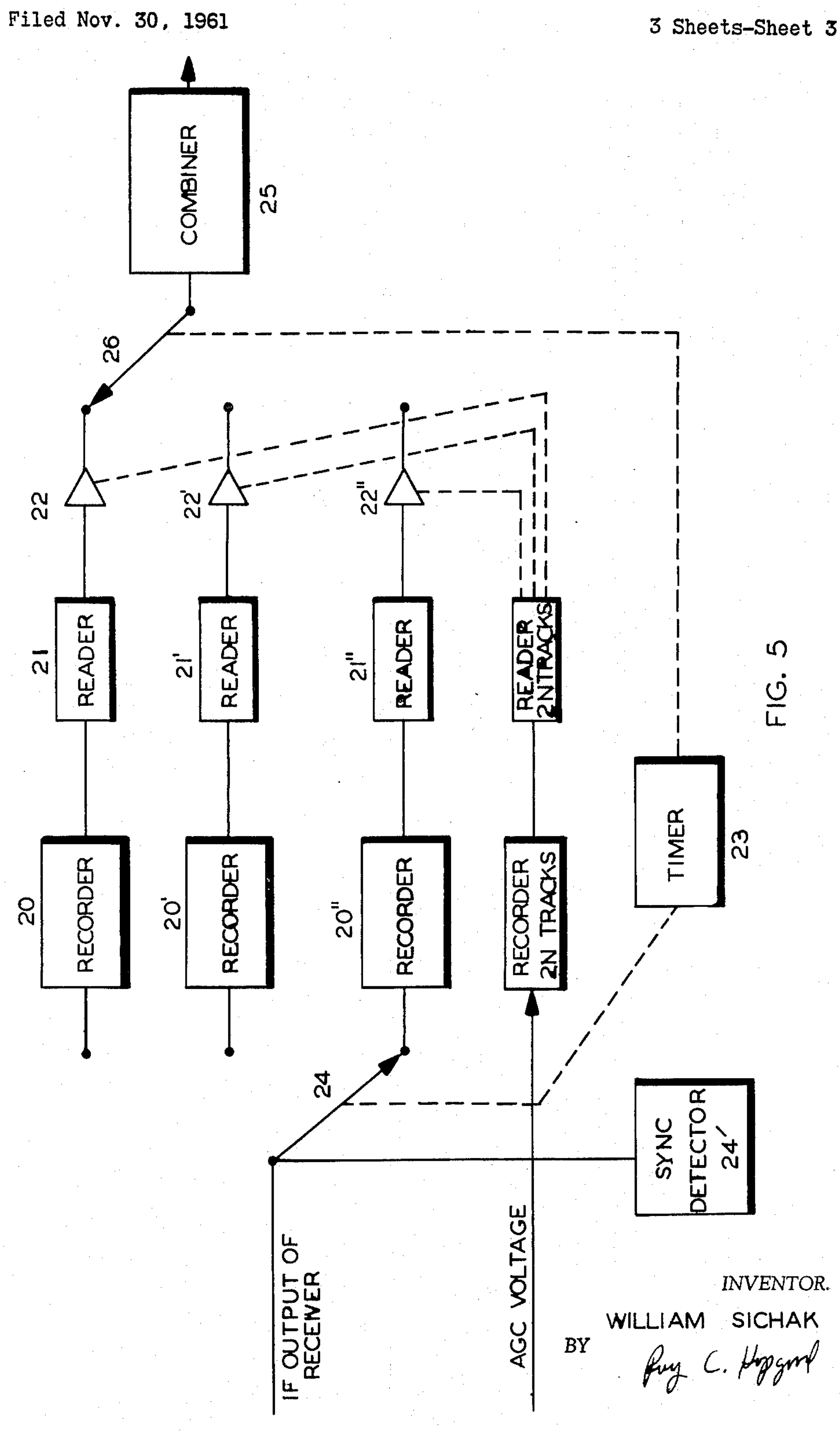
FIG. 5 is a receiving system to be used in association with the transmitting system of FIG. 4 to receive continuous signals.

An alternative transmission and receiving system adapted for use with continuous signals and incorporating the principles of this invention is shown in FIGS. 4 and 5 respectively. In such a continuous system, an increase in diversity can be obtained by providing a single storage means 16 which has associated with it a reading means 17. The storage means must be capable of recording the signal at one speed and the reading means 17 reads out the stored signal at an N repetition rate, where N is the number of readers and also corresponds to the desired degree of diversity. The speed of the storage means is increased N times for read out but converted back to the normal speed before recording. So that the output rate to the transmitter is equal to the input rate additional separate storage means 16′ may be used if the speed can not be converted back and forth with sufficient speed.

Suppose that five marks comprise a set of signals or a word and this word has a duration of 0.5 second. The storage means requires 0.5 second to store this word. However, this word would be read out (in the case where $W=5$) at 0.1 second or less five times.

When a plurality of storage means 16 and 16′ are used (each of which has a plurality of reading means 17′) the circuit operates in similar fashion as to that shown in the system of FIG. 3.

In the example recited, if the storage means can not increase its read out speed 5 times and then switch to normal speed within a small time interval, a plurality of storage means may be used to receive and operate on successive words.

The receiving system shown in FIG. 5 comprises a plurality of storage irrespective means 20 equal to twice N that is twice the number of readers 21. The receiver is also of the synchronous type and utilizes a synchronizing signal from the transmitting means which is shown at 19 in FIG. 4. Storage means 20 must operate at sufficiently high speed to receive the signals transmitted from the successive readers 17 of FIG. 4. However, the readers 21 may operate at a lower speed.

Each of the readers 21 is in turn connected to an amplifier 22 the output of which is controlled by an automatic gain control voltage. The signals which appear at the output of respective amplifiers 22 may be considered as the output of various diversity channels and these signals may be combined through conventional combining means 25 to produce a signal having an enhanced informational content.

The receiving system of FIG. 5 must continuously combine the respective output signals inasmuch as the transmitted signal is a continuous signal. The actual form of the combining means is not considered part of this invention, however, equal gain combining, maximal ratio combining, baseband combining and predetection combining may be employed.

Equal gain combining is obtained if the highest instantaneous AGC voltage controls the amplifier gains. However, this system requires the respective gains in each of the diversity channels be equal. Maximal ratio combining is obtained when the gain of each amplifier is made proportional to the square of its instantaneous voltage. In this case the timer 23, synchronized by the special signal at 19 of FIG. 4, will control a switch 24, the sequencing of the high and low speed operation of the storage means or recorder 20, and the switching of amplifiers 22 to combiner 25. That is when the signal from 19 is received at sync detector 24' and applied to timer means 23, switches 24 and 26 will be successively moved placing, for example, the first diversity channel comprising storage means 20, reader 21 and amplifier 22 in circuit with the combiner 25. The other channels 20', 21', 22' and 20'', 21'' and 22'' are thereafter sequentially connected to combiner 25. For baseband combining, the combiner may consist of detectors whose outputs are added in the proper manner and the gains of the amplifiers 22 are not controlled. For predetection combining, the combiners consist of mixers, voltage controlled oscillators and an adding network followed by one detector. The combining means shown in C. L. Mack, Jr., "Diversity Reception in UHF Long-Range Communications," Proc., IRE, vol. 43, pp. 1281–9, October 1955 and R. T. Adams and B. M. Mindes, "Evaluation of IF and Baseband Combined Receivers," Trans. IRE, vol. CS–6, pp. 8–13, June 1958 are incorporated into this application by this reference.

Having described the principles of my invention in connection with the specific apparatus heretofore disclosed, it is understood that this description has been set forth by way of example and not as a limitation to the claims and accordingly, will be limited to the subject matter expressed in my claims as follows.

I claim:

1. Apparatus for transmitting sets of signals repetitively at a predetermined repetition rate comprising a storage means, means to apply said signals to said storage means, a plurality of read out means, means positioning said read out means at equally spaced intervals, timing means adapted to connect each read out means to said storage means at successive intervals, said timing means being adapted to produce a signal in accordance with said repetition rate, said apparatus including means for transmitting said repeating signals in a time interval substantially less than that of a single set of signals multiplied by the repetitions thereof.

2. A receiving system to extract informational content from a series of repeating sets of signals, each set of signals comprising a series of marks, comprising a storage means having a plurality of substorage means arranged in a series of rows and columns, the number of rows being equal to the number of marks in said set, the number of columns being equal to the number of repetitions of such signal, receiving means to receive said signals, timing means adapted to successively connect said receiving means to the rows of said storage means, and decision comparison means having means to determine the signal stored in each particular column and producing an output signal depending upon the majority indication of the presence or absence of a stored mark, said decision comparison means producing an output signal of the same form as the received signal and means responsive to the output signal to erase said storage means, whereby the sequence may be repeated.

3. A transmission system for improving the degree of time diversity and thereby eliminating some contamination in signals comprising a storage means having a movable magnetic means, means to apply said signal to said magnetic means, read out means positioned at equally spaced intervals along the path of said magnetic means, means to move said magnetic storage means at a predetermined speed, timing means adapted to couple the input of each read out means successively to said storage means and the output of each of the read out means to a transmitter, said timing means being synchronized with the speed of the means moving said magnetic storage means and a receiving system to extract informational content from the series of repeating transmitted signals, each set of signals comprising a series of marks, comprising a second storage means having a plurality of third storage means arranged in a series of rows and columns the number of rows being equal to the number of marks in said set, the number of columns being equal to the number of repetitions of such signal, receiving means to receive said signals, timing means adapted to successively connect said receiving means to the rows of said second storage means, and decision comparison means having means to determine the signal stored in each particular column and producing an output signal depending upon the majority indication of the presence or absence of a stored mark, said decision comparison means producing an output signal of the same form as the received signal.

4. A transmission system to transmit signals at a repetitive rate and without requiring delay in successive signal series, each signal comprising a series of discrete marks, the rate of transmission of said signals being equal to the rate at which said signals are produced, comprising a receiver, a transmitter, first and second storage means, means to apply a first signal to said first storage means, means to apply a second signal to said second storage means, a plurality of reader means coupled to said first storage means, each of said reader means being adapted to read out said first signal successively, all of said reader means reading said signal out at a predetermined rate to avoid delay in transmitting successive series of signals, means to connect the inputs of each of said reader means to said first storage means and to connect the outputs of each reader means to said transmitter, a second plurality of reader means connected to said second storage means, said second reading means being adapted to read out said second signals successively, all of said reader means reading said signal out at a predetermined rate to avoid delay in transmitting successive series of signals, means to connect the inputs of each of said reader means to said second storage means and to connect the outputs of each to said transmitter, and timing means to connect the input to said first storage means to said receiver while said second reader means is connected to said transmitter and to connect said receiver to the input to said second storage means while said first reader means is connected to said transmitter and synchronizing means to produce an output signal after each repetitive interval said synchronizer means being controlled by said timing means.

5. Apparatus for transmitting signals repetitively comprising a transmitter, a storage means, means to read in said signals to said storage means at a read-in rate, a plurality of a read-out means positioned at substantially equally spaced intervals to repetitively read out said signals N times;

said read-out means reading-out at a rate equal to N times the read-in rate, timing means to connect each read-out means to said storage means at successive intervals, and to simultaneously connect said transmitter to said read-out means.

6. In a system for transmitting and receiving signals and for improving diversity and eliminating some error in the reception thereof comprising a transmitter, storage means having at least one movable magnetic means, read-in means to apply said signals to said magnetic means at a first read-in rate, a plurality of read-out means positioned at substantially equal spaced apart intervals along the path of the said magnetic means, means to move said magnetic means to read-out at rates substantially equal to the read-in rate multiplied by the number of read-out means, timing means to couple the input of each read-out means successively to said magnetic means; the output of each of the read-out means to said transmitter, said timing means being correlated with the speed of the means moving said magnetic means.

References Cited by the Examiner

UNITED STATES PATENTS

| | | | |
|---|---|---|---|
| 1,997,683 | 4/35 | Hennig | 178—69 |
| 2,023,446 | 12/35 | Schroeter | 178—69 |
| 2,050,265 | 8/36 | Bowen | 178—4 |
| 2,867,720 | 1/59 | Hoeppner et al. | 325—38 |
| 3,056,114 | 9/62 | Aitel | 340—174 |

DAVID G. REDINBAUGH, *Primary Examiner.*